(No Model.) 6 Sheets—Sheet 1.

R. H. INGERSOLL.
THREAD SELECTING DEVICE FOR MACHINES FOR DRAWING IN WARP THREADS.

No. 590,008. Patented Sept. 14, 1897.

Fig. 1.

WITNESSES:
A. D. Grant.
B. L. Marden.

INVENTOR:
Richmond H. Ingersoll.
by H. E. Teschemacher
Atty.

(No Model.) 6 Sheets—Sheet 6.

R. H. INGERSOLL.
THREAD SELECTING DEVICE FOR MACHINES FOR DRAWING IN WARP THREADS.

No. 590,008. Patented Sept. 14, 1897.

WITNESSES.

INVENTOR.
Richmond H. Ingersoll.
by [signature]
Atty.

UNITED STATES PATENT OFFICE.

RICHMOND H. INGERSOLL, OF BIDDEFORD, MAINE, ASSIGNOR TO MARCIA M. INGERSOLL, OF SAME PLACE.

THREAD-SELECTING DEVICE FOR MACHINES FOR DRAWING IN WARP-THREADS.

SPECIFICATION forming part of Letters Patent No. 590,008, dated September 14, 1897.

Application filed May 3, 1897. Serial No. 634,943. (No model.)

*To all whom it may concern:*

Be it known that I, RICHMOND H. INGERSOLL, a citizen of the United States, residing at Biddeford, in the county of York and State of Maine, have invented certain Improvements in Thread-Selecting Devices for Machines for Drawing in Warp-Threads, of which the following is a specification.

My invention relates to machines for drawing in warp-threads, and particularly to a machine of this character for which Letters Patent of the United States Nos. 461,613 and 468,914 were issued to me, respectively, on the 20th day of October, 1891, and the 16th day of February, 1892; and my invention consists in certain improvements in the mechanism for selecting the warp-threads and placing them in position to be engaged by the reciprocating warp-drawing needle, whereby more perfect separation of the warp-threads before being taken by the selecting-hook is effected and the taking of more than a single thread at a time by said hook effectually prevented, as will be hereinafter more fully set forth and my invention also consists in certain novel combinations of parts and details of construction, as hereinafter particularly set forth, and specifically pointed out in the claims.

In the accompanying drawings.

Figure 1:
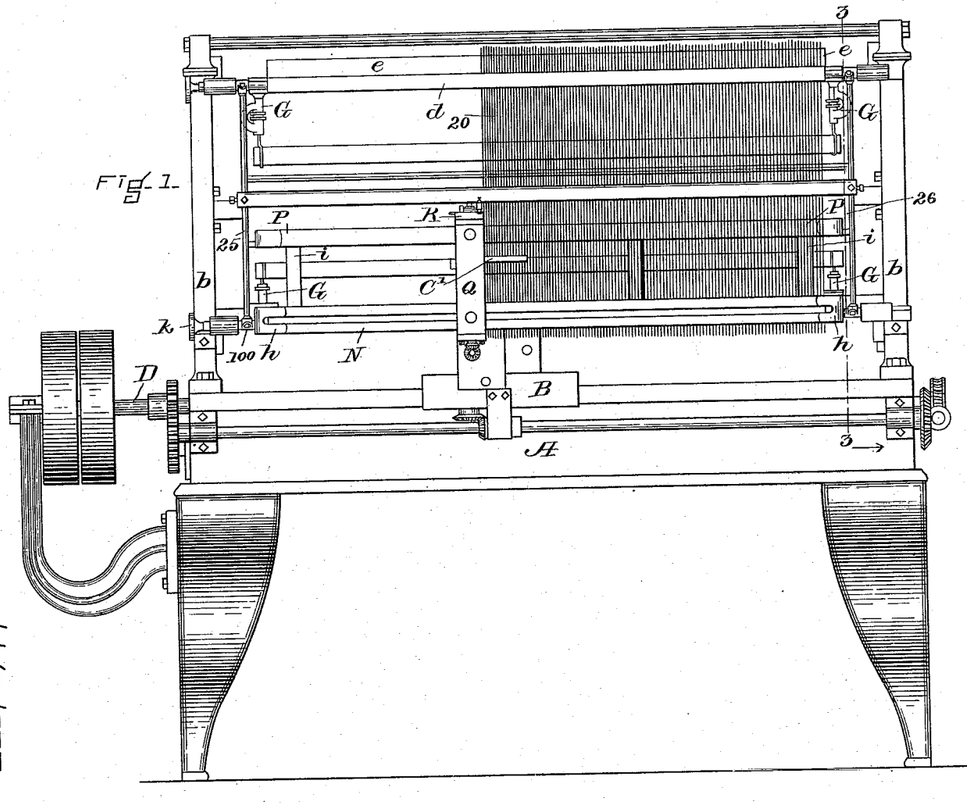
Figure 1 is a rear elevation of a machine for drawing in warp-threads having my improved thread-selecting mechanism applied thereto.

The framework of the machine may be of any suitable construction, and in the present instance consists of a bed A, which is supported on suitable legs and is provided with guides to which is adapted a traversing carriage or slide B, which is fed from right to left by means of a feed-screw C, driven from the main or driving shaft D of the machine through the medium of suitable gearing and other connections. (Not shown.) The shaft D is provided with the ordinary fast and loose pulleys, as shown in Fig. 1.

Between vertical end pieces or standards *b b*, rising from the bed A, are secured four horizontal tubular rods *c*, upon which slide the hangers G, which support the heddles H H, the upper and lower bars of which fit within rectangular eyes or yokes at the ends of said hangers.

I is the heddle-cord-separating mechanism, and J the reed-dent-separating device, constructed and operating as fully described in my aforesaid Letters Patent, No. 461,613.

K represents the reed, which is supported in a suitable frame secured to the standards *b*, and L is the warp-drawing needle, which is a flat steel bar pointed and barbed at its front end, said needle being reciprocated in a tubular casing by suitable mechanism, fully described in my aforesaid Letters Patent, No. 461,613.

Figures 2, 7, 8, 9:
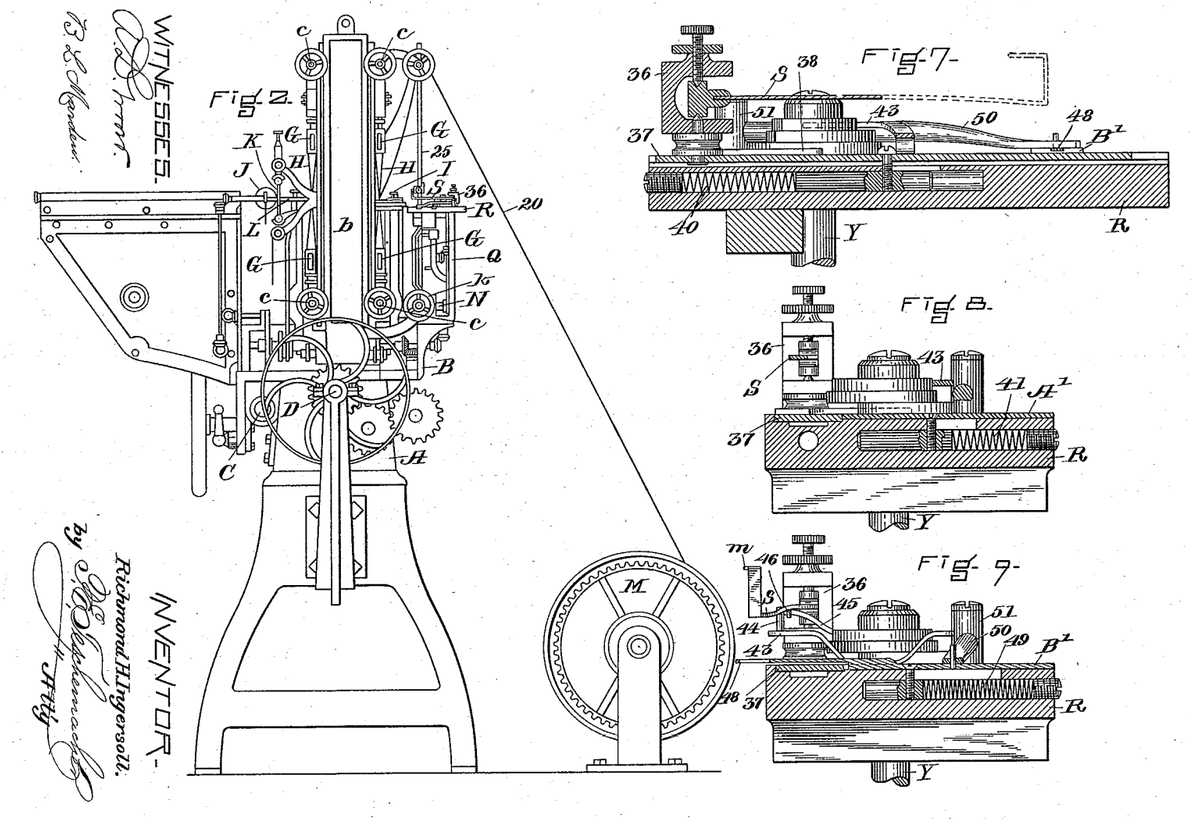
Fig. 2 is a side elevation of the same.
Fig. 7 is a vertical section on the line 7 7 of Fig. 5.
Fig. 8 is a vertical section on the line 8 8 of Fig. 5.
Fig. 9 is a vertical section on the line 9 9 of Fig. 5.

The warp-threads are wound upon the warp-beam M, journaled in bearings in a suitable stand on the floor, as seen in Fig. 2, and said warp-threads pass over a long guide-bar *d*, supported by suitable brackets projecting from the framework of the machine. Over this guide-bar is pressed an inverted U or trough shaped spring-metal clamp e, Fig. 1, the warp-threads being confined between the bar d and the clamp e. The lower clamping-bar N of the warp-holding frame is supported by a tubular rod 100, secured at its opposite ends to suitable brackets on the framework, and said clamping device consists of a long stationary flat bar f and a removable clamping-bar g, the latter being held tightly in place against the face of the flat bar f by removable spring-metal clamps h, the warp-threads being confined between the two bars, and the inner side of the bar g, which presses against the warp-threads, being covered with felt, cloth, or other material to allow each thread to be easily and independently withdrawn by the needle L without disturbing any of the adjacent threads, this clamping device being substantially like that shown and described in my aforesaid Letters Patent, No. 461,613.

Figure 4:
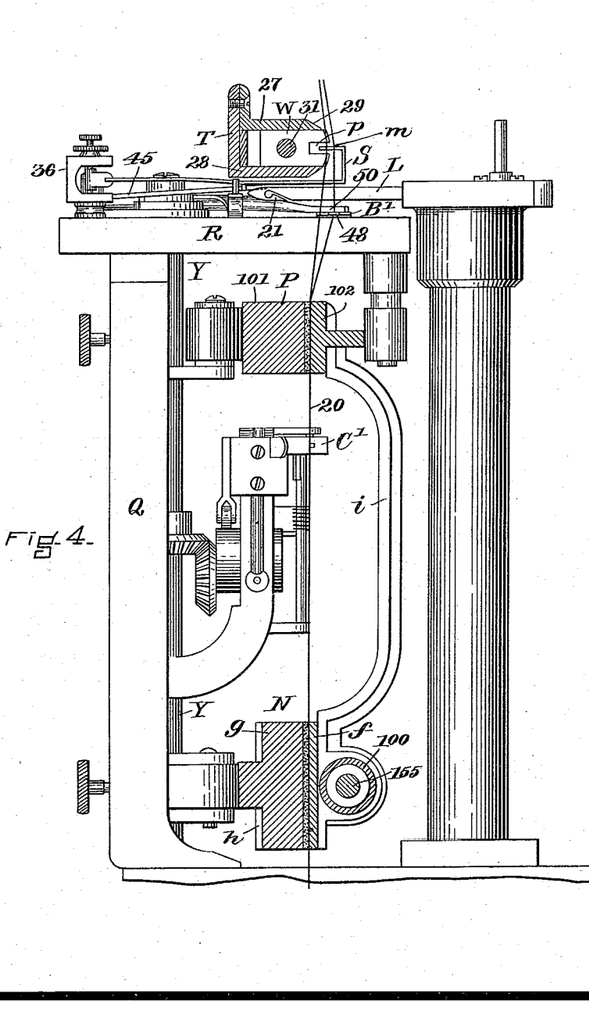
Fig. 4 is a sectional elevation of the warp-thread-selecting device and the standard or frame for supporting the same.

In addition to the two clamping bars or devices above described, which form the upper and lower portions of the warp-holding frame, an intermediate or supplementary clamping bar or device P is employed, composed of two bars 101 102, constructed and held together in the same manner as the bars of the lower clamping device N, the inner side of the bar 101 being covered with felt or cloth. This clamping device P is supported at a suitable distance above the lower clamping device and is rigidly connected therewith by means of a series of vertical connecting-bars i, extending from one to the other, as seen in Figs. 1 and 4, whereby when the lower clamping device N is adjusted longitudinally by turning the hand-wheel k of the screw-shaft 155, connected therewith, the intermediate clamping device P will be simultaneously moved in the same direction, thus keeping the warp-threads in their proper vertical position, this device being fully shown and described in my aforesaid Letters Patent, No. 468,914.

The mechanism by which the warp-threads 20 are successively selected and carried one at a time against the barbed needle L into a position to insure their being caught by its hook 21 as the needle is retracted, so as to be drawn thereby through the eye of the heddle and between the dents of the reed, will now be described.

Q is a standard or frame which is bolted to the carriage B and carries at its upper end a table or platform R, forming a part of said frame, upon which is mounted a swinging curved arm S, carrying at its outer doubled-over end the selecting-hook m, by means of which the warp-threads are successively presented to the reciprocating warp-drawing needle L in a manner to insure each one being caught thereby in its turn, as will be hereinafter more particularly described.

Figure 3:
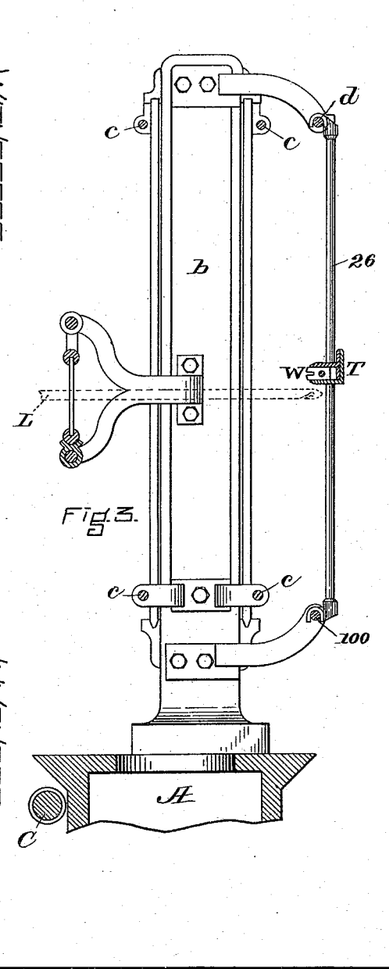
Fig. 3 is an enlarged vertical section of the upper portion of the machine on the line 3 3 of Fig. 1, looking in the direction of the arrow.
Figure 10:
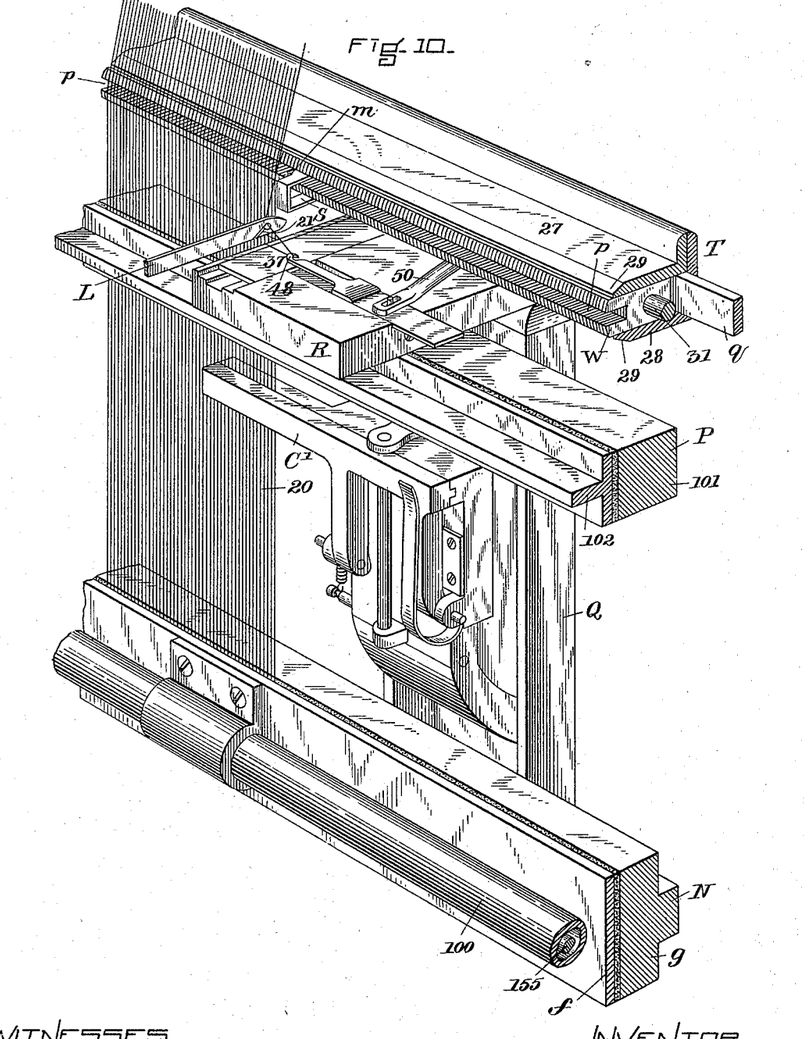
Fig. 10 is a perspective view of the warp-thread-selecting mechanism and the standard or frame for supporting the same.

T is a long bar extending across the back of the machine above the table R, said bar being supported at its opposite ends by vertical bars 25 26, which are held in place by hooking their ends over the upper and lower bars of the warp-holding frame, as shown in Figs. 1 and 3. The bar T is provided with two horizontal flanges 27 28, having comparatively sharp beveled edges 29, against which the warp-threads 20 are tightly pressed when stretched between the upper and lower clamping devices of the warp-holding frame, as shown in Figs. 4 and 10, the warp-threads being thus kept parallel and close together without riding over each other as the table R is fed forward with the carriage B. In the space between the flanges 27 28 is placed a thread-separating comb W, extending nearly the entire length of the bar T and capable of being moved between said flanges in the direction of its width, for a purpose to be presently explained. The comb W is composed of a series of thin metallic plates n, Fig. 14, tightly clamped upon a long rod 31, the alternate plates being a trifle shorter than the others, whereby shallow vertical grooves 32 are formed throughout the length of the front face of the comb, each of the proper width to contain a single warp-thread only, the grooves being separated from each other a distance equal to the thickness of a single plate n, as shown in Figs. 11 and 13, whereby they are adapted to receive the warp-threads lying side by side against the edges of the flanges 27 28 as soon as the comb W has been pushed out so as to project slightly beyond the beveled edges 29, as shown in Fig. 10.

Figure 12:
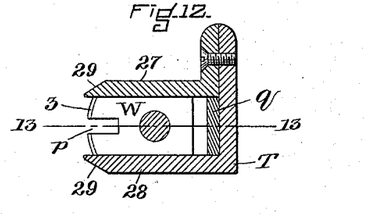
Fig. 12 is a transverse vertical section of the thread-separating comb and its supporting-bar, showing the comb drawn back.
Figure 13:
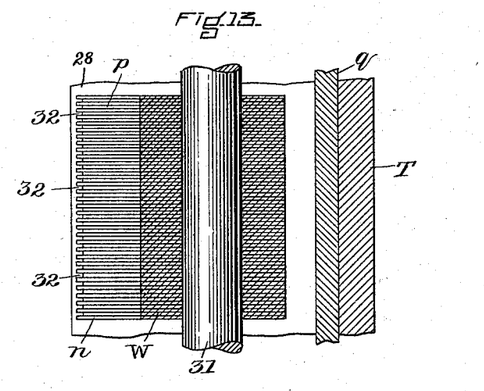
Fig. 13 is an enlarged section on the line 13 13 of Fig. 12.
Figure 14:
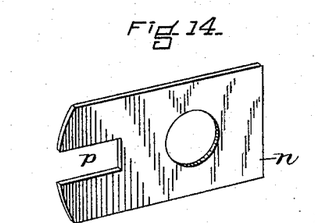
Fig. 14 is a perspective view of one of the series of thin metallic plates of which the thread-separating comb is composed.

During the time that the warp-threads are being properly arranged side by side in the warp-holding frame and stretched in place over the edges of the flanges 27 28 of the supporting-bar T the comb W is drawn back so as to lie entirely within the edges 29 of said flanges, as shown in Figs. 12 and 13, and as soon as the warp-threads have been clamped in place the comb W is pushed or projected out into the position shown in Fig. 10, when the warp-threads will enter the grooves 32 of the comb W, by means of which they are separated and held at a short distance apart ready to be taken one by one by the selecting-hook m, which enters a long narrow slot p, formed in the front of the comb and extending from one end to the other of the same, the selecting-hook m traveling through this slot from end to end as the table R is fed forward with the carriage B and taking the warp-threads in succession to be presented to the warp-drawing needle L, as will be presently described.

Figure 11:
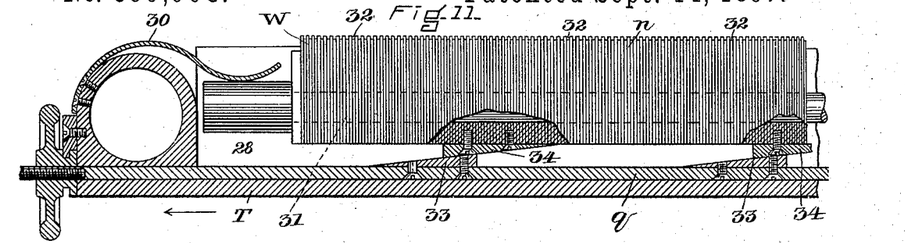
Fig. 11 is a horizontal section of a portion of the thread-separating comb and its double flanged supporting-bar, showing the means by which the comb is operated to advance and withdraw the same.

The comb W is pushed out by means of a long sliding bar q, placed between the back of the comb and the bar T and provided with wedge-shaped projections 33, which act against corresponding wedge-shaped blocks 34, secured to the back of the comb, whereby as the sliding bar q is moved in the direction of the arrow, Fig. 11, by suitable means—for instance, a hand-wheel engaging its threaded end—the comb is pushed out against the resistance of springs 30, Fig. 11, the latter serving to draw back the comb when the slide q is moved in a direction contrary to the arrow.

The arm S, which carries the selecting-hook m, is pivoted between the bifurcations of a post 36, so as to swing laterally in a horizontal plane, said post rising from a slide 37, moving in a guideway in the table R and having an arm 38, which is acted upon by a cam 39 on a vertical shaft Y, Figs. 4, 7, 8, and 9, whereby it is moved in a direction to cause the hook m at the end of the arm S to enter the slot p of the thread-separating comb W, the slide 37, with the arm S, being moved in the opposite direction to withdraw the hook m from the slot by a spring 40, Fig. 7, when permitted to do so by the revolution of the cam 39. The shaft Y is driven from the main or driving shaft of the machine through the medium of suitable gears and shafts. (Not shown.)

Figure 5:
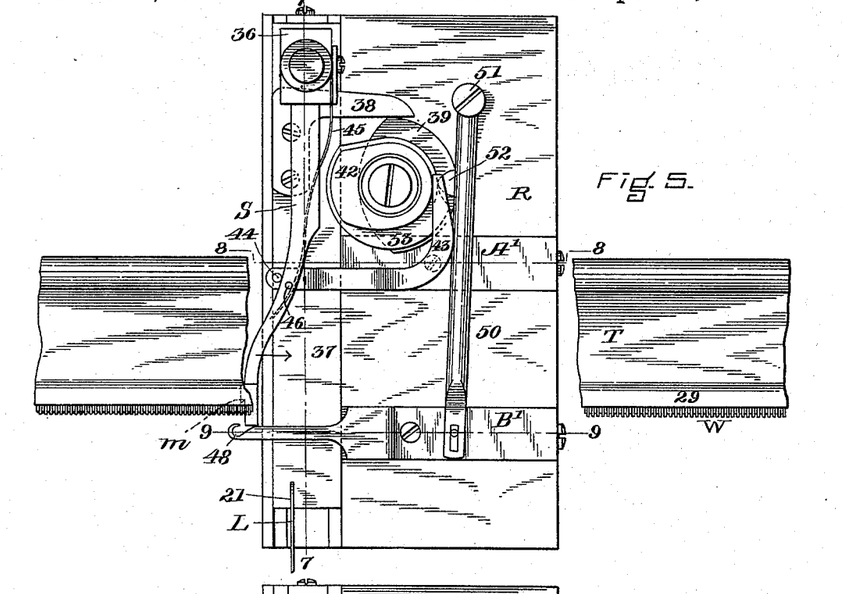
Fig. 5 is a plan of the warp-thread-selecting device and mechanism connected therewith.
Figure 6:
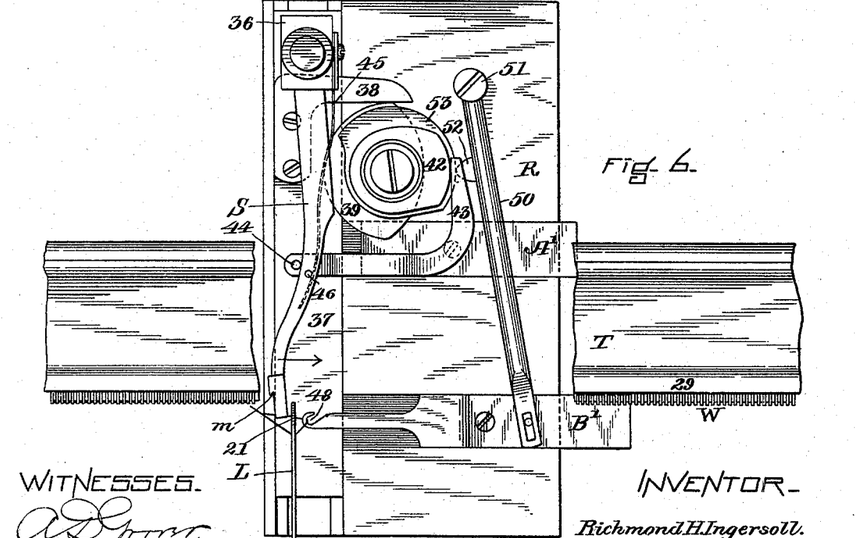
Fig. 6 is a similar plan with the parts in a different position, the warp-drawing needle having just caught a thread and being in the act of pulling it out from the lower and intermediate clamping devices of the warp-holding frame.

A' is a slide moving at right angles to the slide 37 in a guideway in the table R, said slide being operated in one direction by a spring 41 beneath the same, as shown in Fig. 8, and in the opposite direction by a cam 42 on the shaft Y, which acts on a curved arm 43, secured to the slide A' and carrying at its outer end a vertical pin 44, which bears against the arm S and acts to swing it back on its pivot in the direction of the arrow, Figs. 5 and 6, against the resistance of a very light flat spring 45, the outer end of which bears against a pin 46, projecting down from the under side of the arm S. The pin 44 acts to swing back the arm S while the latter is being moved by the cam 39 to cause the selecting-hook m to enter the slot p, which prevents the said hook from coming into contact with and disturbing the warp-threads in its backward movement. After the selecting-hook has fully entered the slot p the slide A' is moved by its spring 41 in a direction contrary to the arrow, thus releasing the arm S, which is then caused by its spring 45 to bear lightly against the foremost warp-thread of the series, as shown in Fig. 5, as is necessary to enable it to be engaged by the selecting-hook m as the latter moves out of the slot p.

B' is a slide moving parallel with the slide A' in a guideway in the table R and provided at one end with a hook 48, lying in a horizontal plane, said slide B' being operated in one direction by a spring 49 beneath the same, as shown in Fig. 9, and in the opposite direction by a lever 50, connected therewith by a slot and pin and pivoted at its opposite end at 51 to the table R, a projection 52 on one side of this lever being acted upon by a cam 53 on the shaft Y. This hook 48 coöperates with the selecting-hook m, and as soon as a single warp-thread has been selected by the hook and carried out thereby in front of the comb W it is caught by the hook 48 of the slide B', which has been previously advanced by the spring 49 into a position to engage it, said movement of the hook 48 having been effected just before the selecting-hook m commences to move out of the slot p of the comb W, and as the slide B' is drawn back by the cam 53 the warp-thread is engaged by the hook 48 and carried thereby at an angle against the lower edge of the reciprocating warp-drawing needle L, which has by this time completed its outward movement, and into a position to insure its being caught by the hook or barb 21 of said needle L, as shown in Figs. 6 and 10, which as it is retracted carries the warp-thread back through the eye of the heddle and through the reed, as fully described in my aforesaid patents, Nos. 461,613 and 468,914. As the hook 48 is drawn back to carry the warp-thread against the lower edge of the needle L the selecting-hook m is swung back in the direction of the arrow, Figs. 5 and 6, to clear it from the warp-thread, by the pin 44 on the arm 43 and is simultaneously caused by the movement of the slide 37 to reënter the slot p of the comb W, as previously described, after which the arm 43 is again moved to release the arm S and permit it to be swung by its spring 45 into a position to bring the hook m into contact with the next warp-thread, when the operation continues as before.

By means of my improved mechanism above described it will be seen that the warp-threads are properly separated and presented one by one to the warp-threading needle with absolute certainty, and all liability of the threads becoming entangled in the mechanism and broken, as was liable to occur with the rotary selecting-hook employed in my former patents, is avoided. Furthermore, the mechanism is simpler and less liable to get out of order, which is an important consideration in machines of this character.

C' represents the horizontal vertically-reciprocating nippers, which operate to take up any slack in the warp-threads as they are presented to the selecting mechanism. These nippers are substantially similar in construction and mode of operation to those shown and described in my aforesaid patents, Nos. 461,613 and 468,914, and as they form no part of my present invention they will not be here in further described.

What I claim as my invention, and desire to secure by Letters Patent, is—

1. In a warp-drawing machine, the combination with a warp-holding frame, of a bar or support provided with parallel flanges over the edges of which the warp-threads are stretched, and a warp-thread-separating comb movable inwardly and outwardly between said flanges and having its face provided with a series of vertical thread-holding grooves for the reception of the warp-threads when said comb is projected beyond the edges of the flanges of the supporting-bar between which it is held, substantially as set forth.

2. In a warp-drawing machine, the combination with a warp-holding frame, of a supporting-bar provided with parallel flanges over which the warp-threads are stretched, a warp-thread-separating comb movable inwardly and outwardly between said flanges and having its outer face provided with vertical thread-holding grooves for the reception of the warp-threads, and means for actuating said comb, whereby it may be projected beyond the edges of its supporting-flanges to cause the warp-threads to enter its grooves, and retracted within said flanges out of engagement with the warp-threads while the latter are being arranged in the warp-holding frame and stretched over the flanges of the supporting-bar, substantially as set forth.

3. In a warp-drawing machine, a thread-separating comb composed of a series of thin plates clamped upon a rod or bar, and of different lengths arranged alternately to form vertical thread-holding grooves on the front face of the comb, a flanged supporting-bar embracing said comb, and means for moving said comb to cause its front grooved face to engage the warp-threads, substantially as described.

4. In a warp-drawing machine, the combination with a double flanged bar T, of the thread-separating grooved comb W, provided at its back with wedge-shaped projections 34, the sliding bar $q$ having corresponding wedge-shaped projections 33 engaging the projections 34, springs for retracting the comb within the flanges of the supporting-bar, and means for operating the sliding bar $q$ to advance or push out the comb to cause it to engage the warp-threads, substantially as set forth.

5. In a warp-drawing machine, the combination with a warp-holding frame, of a thread-separating comb provided with vertical thread-holding grooves and movable outwardly and inwardly in a supporting bar or holder, and having a longitudinal slot extending from one end to the other, a warp-thread-selecting hook operating within said longitudinal slot and adapted to successively engage the warp-threads held within the grooves of the comb, and means for operating said selecting-hook, substantially as described.

6. In a warp-drawing machine, the combination with a warp-thread holding and stretching device, of a laterally-swinging selecting-hook having a reciprocating movement in the direction of its length and adapted to successively engage the warp-threads and draw out the same, a second hook reciprocating transversely across the path of the selecting-hook and adapted to engage the warp-thread after it has been drawn out by the selecting-hook, and means for reciprocating said hooks and swinging the selecting-hook away from the warp-threads as it is moved inward to take a fresh thread, substantially as set forth.

7. In a warp-drawing machine, the combination with the warp-drawing needle and a thread-separating comb provided with vertical thread-holding grooves and movable inwardly and outwardly in a supporting bar or holder and having a longitudinal slot extending from one end to the other, of a thread-selecting hook mounted on a laterally-swinging arm having a reciprocating movement in the direction of its length, said hook operating within the longitudinal slot of the thread-separating comb, a spring for holding the selecting-hook with a light pressure against the foremost warp-thread, a second hook reciprocating at an angle transversely across the path of the selecting-hook and adapted to catch the warp-thread after it has been drawn out by the selecting-hook and carry the same at an angle against the lower edge of the warp-drawing needle, and means for operating said second hook and swinging the selecting-hook backward against the resistance of its spring to clear the foremost warp-thread as it enters the longitudinal comb-slot, substantially as set forth.

8. In a warp-drawing machine, the combination with a warp-holding device, and a warp-drawing needle, of a thread-separating comb provided with a central longitudinal slot and having on its front face a series of vertical thread-holding grooves, a supporting bar or holder for said comb provided with horizontal parallel flanges over the edges of which the warp-threads are stretched and between which the comb is placed, said comb having an independent inward and outward movement, whereby it may be projected beyond the edges of the flanges of the supporting-bar to cause the warp-threads to enter its vertical grooves, a reciprocating slide the arm S with its selecting-hook $m$ pivoted to said reciprocating slide and having a laterally-swinging movement toward and away from the warp-threads and provided with a light spring for holding the selecting-hook against the foremost warp-thread, an arm provided with a pin for drawing back the selecting-hook arm against the resistance of its light spring, a second hook reciprocating at an angle transversely across the path of the selecting-hook and adapted to engage the warp-thread after it has been drawn out by the selecting-hook, and carry the same at an angle against the lower edge of the warp-drawing needle, and means for operating the said two hooks, substantially as set forth.

9. In a warp-drawing machine, the combination with a warp-threaded holding and stretching device and a warp-drawing needle, of a traveling table or platform, a slide moving in a guideway therein, a post rising from said slide a laterally-swinging arm pivoted to said post and provided with a thread-selecting hook, a light spring for swinging the selecting-hook into contact with a warp-thread, a second slide moving in a guideway in the table at right angles to the first slide, and provided with an arm acting to swing the arm of the selecting-hook away from the warp-threads against the resistance of its light spring, a third slide moving in a guideway in the table parallel with the second slide, and having a hook at one end adapted to catch the warp-thread after it has been drawn out by the selecting-hook and carry the same at an angle against the lower edge of the warp-drawing needle, and cams and springs for actuating the said slides, all operating substantially as set forth.

Witness my hand this 22d day of April, A. D. 1897.

RICHMOND H. INGERSOLL.

In presence of—
P. E. TESCHEMACHER,
V. E. TEDFORD.